(12) United States Patent
Kuhnt

(10) Patent No.: US 11,192,415 B2
(45) Date of Patent: Dec. 7, 2021

(54) JOINTED YOKE AND ACTUATOR HAVING A JOINTED YOKE

(71) Applicant: ZF Friedrichshafen AG, Friedrichshafen (DE)

(72) Inventor: Torsten Kuhnt, Diepholz (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 94 days.

(21) Appl. No.: 16/475,725

(22) PCT Filed: Dec. 18, 2017

(86) PCT No.: PCT/EP2017/083216
§ 371 (c)(1),
(2) Date: Jul. 3, 2019

(87) PCT Pub. No.: WO2018/137850
PCT Pub. Date: Aug. 2, 2018

(65) Prior Publication Data
US 2019/0344632 A1    Nov. 14, 2019

(30) Foreign Application Priority Data
Jan. 27, 2017    (DE) ................... 10 2017 201 352.4

(51) Int. Cl.
*B60G 7/00* (2006.01)
*B62D 7/16* (2006.01)

(52) U.S. Cl.
CPC ............... *B60G 7/006* (2013.01); *B62D 7/16* (2013.01); *B60G 2204/143* (2013.01);
(Continued)

(58) Field of Classification Search
CPC .... B60G 7/006; B60G 7/16; B60G 2204/143; B60G 2204/4302; B60G 2206/8207; B60G 2206/11; F16C 2326/24
See application file for complete search history.

(56) References Cited

U.S. PATENT DOCUMENTS

| | | | |
|---|---|---|---|
| 5,005,859 A | * | 4/1991 | Satoh ................... B60G 11/183 188/130 |
| 5,238,262 A | | 8/1993 | Nunes |

(Continued)

FOREIGN PATENT DOCUMENTS

| | | |
|---|---|---|
| DE | 34 41 560 A1 | 5/1986 |
| DE | 10 2014 206 934 A1 | 10/2015 |
| DE | 10 2015 211 414 A1 | 12/2016 |

OTHER PUBLICATIONS

International Search Report Corresponding to PCT/EP2017/083216 dated May 15, 2018.
(Continued)

*Primary Examiner* — Frank B Vanaman
(74) *Attorney, Agent, or Firm* — Finch & Maloney, PLLC; Michael J. Bujold; Jay S. Franklin

(57) ABSTRACT

A joint fork (1) for connection to a joint. The joint fork having two side plates (2a, 3) that are arranged approximately parallel with one another, and each having a side plate surface (F1, F2). A web (2b) connects the side plates (2a, 3) with one another. A fixing bore (6) is arranged in the web (2b) and has a longitudinal axis (a). The joint forks (1) are coupled to an actuator. The side plate surfaces (F1, F2) form, with the longitudinal axis (a), an angle of inclination (α) and the angle of inclination (α) is in the range from 20° to 70°, in particular around 30°. The actuator is fitted with the joint forks (1).

12 Claims, 1 Drawing Sheet

(52) U.S. Cl.
CPC .............. *B60G 2204/4302* (2013.01); *B60G 2206/8207* (2013.01); *F16C 2326/24* (2013.01)

(56) References Cited

U.S. PATENT DOCUMENTS

| | | | | |
|---|---|---|---|---|
| 5,316,818 | A * | 5/1994 | Hilliard | B62D 7/16 |
| | | | | 428/99 |
| 7,032,917 | B1 * | 4/2006 | Chelgren | A61G 5/10 |
| | | | | 280/250.1 |
| 2005/0098975 | A1 * | 5/2005 | Yun | B60G 7/006 |
| | | | | 280/124.127 |
| 2006/0232035 | A1 * | 10/2006 | Lambert | B62D 7/16 |
| | | | | 280/93.502 |
| 2007/0278778 | A1 | 12/2007 | Tanaka et al. | |
| 2015/0061250 | A1 * | 3/2015 | Yamada | B62D 17/00 |
| | | | | 280/86.757 |
| 2015/0145228 | A1 * | 5/2015 | Hock | B60B 35/02 |
| | | | | 280/124.116 |
| 2015/0197273 | A1 * | 7/2015 | Schroeder | B62D 3/12 |
| | | | | 74/422 |

OTHER PUBLICATIONS

Written Opinion Corresponding to PCT/EP2017/083216 dated May 15, 2018.

* cited by examiner

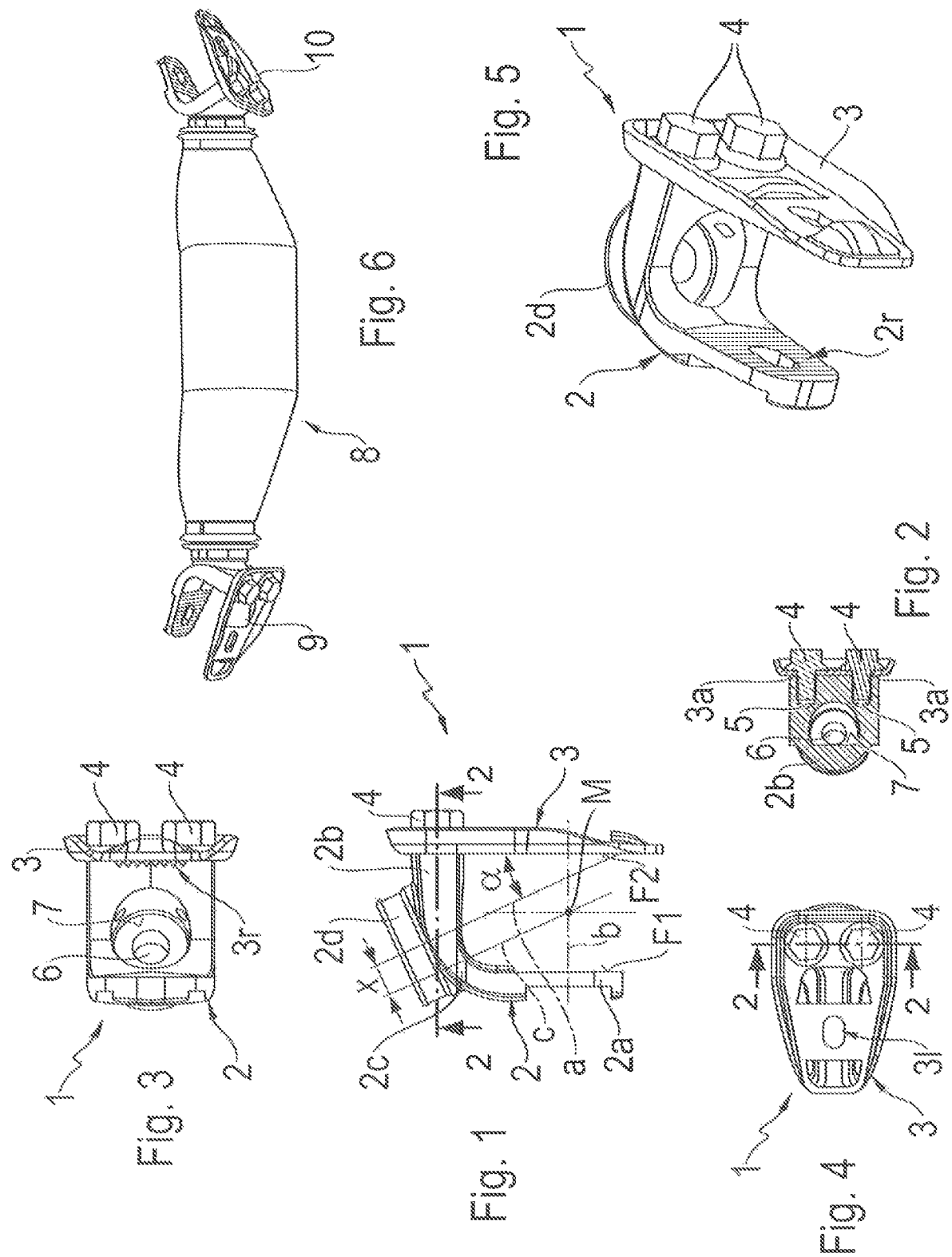

JOINTED YOKE AND ACTUATOR HAVING A JOINTED YOKE

This application is a National Stage completion of PCT/EP2017/083216 filed Dec. 18, 2017, which claims priority from German patent application serial no. 10 2017 201 352.4 filed Jan. 27, 2017.

FIELD OF THE INVENTION

The invention relates to a joint fork for connection to a joint, and an actuator for a rear-axle steering system.

BACKGROUND OF THE INVENTION

From DE 10 2015 211 414 A1 by the present applicant, a joint fork for connection to an articulated rod, in particular a transverse control arm or track rod, is known. The joint fork has a web with a through-bore and two arms or side plates arranged parallel to one another, with a slight inclination. Inside the fork, i.e. between the two side plates, a joint in the form of a rubber mounting is arranged, which is connected to the track rod. Alternatively, a ball joint such as a ball sleeve joint could also be fitted there. The joint fork is connected to a screw-on or plug-in stud by means of a screw-bolt passing through the through-bore. Problems may arise if the side plates of the joint fork should be more inclined relative to the axis of the screw-bolt or the plug-in stud, for example due to the fitting conditions of an actuator for a rear-axle steering system of a motor vehicle. These problems relate in particular to production technology, because the machining of the web is made more difficult.

An actuator for a rear-axle steering system is known from DE 10 2014 206 934 A1 by the present applicant. The actuator comprises an electric-motor-driven spindle drive with a spindle whose ends are connected to so-termed screw-on studs, which for their part are connected to joint forks. The known actuator is in the form of a regulator with a two-sided action, and is arranged in the middle of the vehicle between the two rear wheels. The forks are in each case connected by way of track-rods to the wheel carriers of the rear wheels. The screw-on studs, also called bearing sleeves, are fitted so that they can be moved axially relative to the housing of the actuator by way of slide bearings.

The joint fork of the type mentioned at the start should be adapted for changed fitting conditions. A control arm for a chassis or an actuator for a rear-axle steering system with joint forks should also be adapted for changed fitting conditions.

SUMMARY OF THE INVENTION

According to a first aspect of the invention, the arms or side plates of the joint fork, together with the web, also referred to for short as the fork, are arranged at a marked inclination relative to the longitudinal axis of the fixing bore. In this case the angle of inclination of the side plates relative to the longitudinal axis is in the range 20° to 70°, preferably 30°. This provides further application possibilities for the joint fork, for example as a connecting member between elements of a kinematic chain. For example, by means of the joint fork a joint such as a ball joint or a ball sleeve joint, a wheel carrier or a control arm can be connected so that it can rotate and/or pivot. In the case of a rear-wheel steering system, the linear movement of the actuator or regulator can be converted by means of the kinematic chain into a steering movement of the wheel carrier and thus of the wheel.

According to a preferred embodiment, the fork is made in at least two or more parts, with one of the two side plates made as a separate component. The side plate can be made separately. Thus an assembled fork is produced, which consists of a basic body comprising a web with an integrally connected side plate and the separately made side plate. By virtue of the two-part structure of the fork the fixing bore and a contact surface arranged coaxially with it for the screw-bolt can be made simply and therefore inexpensively, by machining. Moreover this has advantages for the assembly of the associated joint, in particular a rubber mounting, which is fitted into the joint for example by pressing in because the separate component bends more easily than the side plate opposite it. The rubber mounting can be clamped between the two side plates. Thus, even large tolerances for the aperture width of the fork can be accepted. The aperture width is the distance of the side plates from one another. The side plates are preferably arranged approximately and even more preferably exactly parallel to one another.

In another preferred embodiment the separate component, i.e. the separate side plate, can be screwed onto the web of the basic body. This makes for a simple way to connect and fix the two components in order to form the joint fork.

According to a further preferred embodiment, at its interface the web has a contact surface with internally threaded blind holes or with threaded bores into which fixing screws can be screwed. The fixing screws pass through openings in the separate component (side plate), which therefore forms a frictional connection or clamped connection with the web of the joint fork.

In a further preferred embodiment the separate component can be made as a sheet-metal component, for example by a deformation process such as stamping with an appropriate stiffening profile, which allows it to be produced inexpensively.

According to a further preferred embodiment the basic body of the joint fork can be made in one piece that consists of the web and one side plate—without the separate component—as a forged component. This gives the joint fork the requisite strength. Moreover, this forging can be released from the die more simply by changing the forging direction, so that on the one hand a lighter blank and on the other hand a smaller volume to be machined are obtained. This saves both material and processing costs.

In a further preferred embodiment the side plates and the web of the forged component (basic body) are connected to one another by a curved section, such that in the area of the curved section an attachment support with the fixing bore is arranged. By virtue of this attachment support the joint fork can be connected by a screw-bolt to a further component such as a screw-on stud of an actuator or an axle carrier or a wheel carrier. Alternatively, the joint fork can also be attached to a control arm such as a track-rod or transverse control arm and the rubber mounting can be arranged on the actuator, the axle carrier or the wheel carrier.

Preferably the side plates of the joint fork, at least over part of their inside surfaces, are knurled. This promotes greater friction with the component to which it is being joined, so that slipping of the screw connection is avoided. In other words, the screw connection can be made smaller since on account of the knurling lower tightening torques can be chosen.

According to a further aspect of the invention, an actuator is provided with a spindle drive having at least one joint fork which embodies the above-mentioned features, in particular being formed by at least two or more pieces. When an actuator is fitted for the rear-axle steering of a motor vehicle, preferably an actuator with a two-sided action having two forks, it can happen that the track-rods articulated to the two forks of the actuator make a larger angle, for example 30° in each case, with the spindle axis of the actuator. Since the side plates of the joint fork have the same angle of inclination as the track-rods, this fitting position in the motor vehicle can be realized. In particular, in an advantageous manner additional fitting space, for example in the direction opposite to the travel direction, is obtained in the motor vehicle. In other words, to make allowances for further chassis or drive components the actuator can be fitted a distance away from the rear axle. There is no need to locate the actuator very close to the axle.

According to a further preferred embodiment the joint fork is connected to the screw-on studs of the actuator by means of a screw-bolt that passes through the fixing bore. In that way the fork, with the actuator components that move linearly, can preferably be attached at least to the spindle as before by screwing.

BRIEF DESCRIPTION OF THE DRAWINGS

An example embodiment of the invention is illustrated in the drawings and will be described in greater detail below, so that further features and/or advantages may emerge from the description, and/or from the drawings, which show:

FIG. 1: A view of a joint fork according to the invention,
FIG. 2: A section along the plane 2-2 in FIGS. 1 and 4,
FIG. 3: A view of the joint fork, seen from below,
FIG. 4: A side view of the joint fork,
FIG. 5: A perspective representation of the joint fork, and
FIG. 6: An actuator with fitted joint forks.

DETAILED DESCRIPTION OF THE PREFERRED EMBODIMENTS

FIG. 1 shows a joint fork 1 according to the invention, which can preferably be used for a rear-axle steering system of a motor vehicle, i.e. for connection or attachment to an actuator. For this, reference is made to the document DE 10 2014 206 934 A1 by the present applicant, mentioned at the beginning. The joint fork 1 is made in two parts, i.e. it consists of two components, a forged component 2 that forms a basic body and a separately made sheet component 3. The two components 2, 3 are connected firmly to one another by fixing screws 4, so that from the basic body/forged component and the separate side plate a joint fork with two side plates, or to name them differently two arms, is formed. The forged component 2 has a first side plate 2a, a web 2b and a curved section 2c that connects the first side plate 2a and the web 2b, so that the forged component 2 is approximately L-shaped. The separate component 3 made as a sheet-metal component forms the second side plate 3. The two side plates 2a and 3 have inside surfaces F1, F2 arranged essentially parallel to one another. In the area of the curved section 2c and partially in the area of the web 2b is arranged an attachment support 2d, which is made integrally, i.e. forged onto the forged component 2. Inside the attachment support 2d there extends a fixing bore (not visible in FIG. 1) with the longitudinal axis a, which forms with the inside surface F2 of the second side plate 3 an angle of inclination α. In the two side plates 2a, 3 are formed openings (not shown) with a common axis b. The openings serve to receive a screw-bolt (not shown) for fixing a rubber mounting of a control arm, as for example is known from DE 10 2015 211 414 A1 by the present applicant, mentioned earlier, in which particular reference is made to FIG. 2b.

The above-mentioned angle of inclination α is in a range of 20°≤α≤70°, preferably around 30°. This makes it possible to articulate an actuator 8 (FIG. 6) arranged centrally in the vehicle kinematically effectively to an obliquity angle of around 30° (−20°, +40°) relative to the transverse or y-axis of the vehicle. As can be seen from FIG. 1, this produces an offset x of the spindle axis, which corresponds to the longitudinal axis a, and the so-termed kinematic axis c which intersects the axis b of the rubber mounting at its mid-point M, also known as the kinematic point. The offset x is to be attributed to the fact that the spindle axis a has been displaced in the vehicle to the rear, i.e. contrary to the travel direction, for reasons of space. The kinematic axis c is thus no longer identical to the spindle axis a.

FIG. 2 shows a section in the plane 2-2 in FIG. 1 (and FIG. 4), i.e. in the area where the separate component 3 is attached to the web 2b. The separate component 3 is in the form of a profiled sheet component and has two openings 3a, through which the fixing screws 4 are inserted and screwed into threaded holes or bores 5 in the web 2b. In the sectioned view, moreover, the fixing bore 6 and an annular contact surface 7 for the screw head of a screw-bolt (not shown) can be seen.

FIG. 3 shows a view of the assembled fork 1 with its forged component 2, side plate 3 as a separate component, and fixing screws 4, as seen from below. The fixing bore 6 and the machined contact surface 7 for the screw-bolt can also be seen. The side plate 3 has a hole 3l (see also FIG. 4) through which a bolt or a screw can be inserted for the already-mentioned connection to a wheel carrier or control arm or a ball joint or ball sleeve joint. Around this hole, on the inside of the second side plate 3, i.e. inclined toward the first side plate 2a of the basic body 2, knurling 2r is formed, for example by rolling. After the assembly of the fork with the aforesaid components this knurling prevents slipping of the components or of the connection relative to one another. This also allows a smaller screw or screw-head size to be used during assembly.

FIG. 4 shows a side view of the joint fork 1 with particular reference to the separate component 3 and the fixing screws 4.

FIG. 5 shows a perspective representation of the assembled joint fork 1 with its forged component 2, the second side plate 3 as a separate component, fixing screws 4 and the forged-on attachment support 2d. The first side plate 2a on the forged component or basic body 2 has knurling all over its inside surface and there is also knurling 3r on the inclined inside surface of the second side plate 3. After extraction from the forging die this knurling can be produced by deformation, such as rolling. In a forged fork with two side plates such knurling could be produced only with great difficulty and cost.

FIG. 6 shows an actuator 8 with two assembled joint forks 9, 10, which correspond to the above-described fork 1. As is known from the prior art, the actuator 8 has a spindle drive (not visible here) with a spindle, whose ends are connected to the forks 9, 10 by means of screw-on studs. To the forks 9, 10, wheel carriers can be connected or attached directly, or by way of control arms such as track-rods. Thus, a linear displacement of the spindle can produce a steering movement of the wheel carriers.

Indexes

1 Joint fork/fork
2 Forged component/basic body
2a First side plate

2b Web
2c Curved section
2d Attachment support
2r Knurling
3 Separate component/second side plate
3a Opening
3l Hole
3r Knurling
4 Fixing screw
Threaded bore
6 Fixing bore
7 Contact surface
8 Actuator
9 First fork
Second fork
a Longitudinal axis
b Joint axis
c Kinematic axis
F1 Inside surface of the first side plate
F2 Inside surface of the second side plate
M Mid-point/kinematic point
x Offset
α Angle of inclination

The invention claimed is:

1. A joint fork, for connecting to a joint, for a control arm or a rear-axle steering system, the joint fork comprising:
first and second side plates being arranged at least substantially parallel to one another, and each of the first and the second side plates having a respective side plate surface,
a web connecting the first and the second side plates to one another,
a fixing bore arranged in the web and having a longitudinal axis,
the side plate surfaces forming an angle of inclination with the longitudinal axis, and the angle of inclination ranges from 20° to 70°, and one of the first and the second side plates is connected to the web such that the side plate surface thereof intersects the longitudinal axis of the fixing bore,
the joint fork is made in two parts and the one of the first and the second side plates is made as a separate component, and
the separate component is screwable onto the web of the joint fork.

2. The joint fork according to claim 1, wherein the web has threaded bores and fixing screws are threadable into the threaded bores to fix the separate component.

3. The joint fork according to claim 1, wherein the separate component is made as a sheet-metal component.

4. The joint fork according to claim 1, wherein the web and the other one of the first and the second side plates of the joint fork (1) is made as a forged component.

5. The joint fork according to claim 4, wherein the first side plate of the first and the second side plates and the web of the forged component merge into one another by way of a curved section and, in an area of the curved section, an attachment support is arranged coaxially with the longitudinal axis of the fixing bore.

6. The joint fork according to claim 1, wherein inside surfaces of the first and the second side plates are at least partially knurled.

7. The joint fork according to claim 1, wherein the angle of inclination is 30°.

8. An actuator with a spindle drive having a spindle for a rear-axle steering system of a motor vehicle, and the actuator comprising at least one joint fork connected to the spindle; and
the at least one joint fork having first and second side plates being arranged at least substantially parallel to one another,
each of the first and second side plates having a respective side plate surface,
a web connecting the first and the second side plates to one another,
a fixing bore being arranged in the web and having a longitudinal axis,
the side plate surfaces form an angle of inclination with the longitudinal axis and the angle of inclination ranges from 20° to 70°, and one of the first and the second side plates is connected to the web such that the side plate surface thereof intersects the longitudinal axis of the fixing bore,
the at least one joint fork is made in two parts and the one of the first and the second side plates is made as a separate component, and
the separate component is screwable onto the web of the at least one joint fork.

9. The actuator according to claim 8, wherein the at least one joint fork is connected to a screw-on stud of the spindle by a screw-bolt that passes through the fixing bore.

10. The joint fork according to claim 9, wherein the angle of inclination is 30°.

11. A joint fork for a control arm or a rear-axle steering system, for connecting to a joint, the joint fork comprising:
first and second side plates being arranged parallel to one another, each of the first and the second side plates having a side plate surface, and the side plate surfaces of the first and the second side plates facing one another;
a web connecting the first and the second side plates to one another, and the web having a fixing bore which defines a longitudinal axis;
the side plate surfaces of the first and the second side plates being at an angle of inclination relative to the longitudinal axis, the angle of inclination ranges between 20° and 70°, and the side plate surface of one of the first and the second side plates intersects the longitudinal axis,
the joint fork is made in two parts and the one of the first and the second side plates is made as a separate component, and
the separate component is screwable onto the web of the joint fork (1).

12. The joint fork according to claim 11, wherein the angle of inclination is 30°.

* * * * *